United States Patent
Selb

(10) Patent No.: US 6,572,119 B2
(45) Date of Patent: Jun. 3, 2003

(54) AXIAL CHUCK

(75) Inventor: Manfred Selb, Kirchheim (DE)

(73) Assignee: Josef Albrecht Bohrfutterfabrick GmbH & Co., Wernau (DE)

(*) Notice: Subject to any disclaimer, the term of this patent is extended or adjusted under 35 U.S.C. 154(b) by 0 days.

(21) Appl. No.: 09/987,705

(22) Filed: Nov. 15, 2001

(65) Prior Publication Data

US 2002/0053772 A1 May 9, 2002

(30) Foreign Application Priority Data

Nov. 15, 2000 (DE) .......................... 100 56 729

(51) Int. Cl.$^7$ ............................ B23B 31/20
(52) U.S. Cl. .................. 279/52; 279/53; 279/156; 279/157; 409/234
(58) Field of Search ............... 279/51–53, 103, 279/60, 61, 156, 157, 46.9, 39, 58; 409/234

(56) References Cited

U.S. PATENT DOCUMENTS

| | | | | |
|---|---|---|---|---|
| 896,663 A | * | 8/1908 | Rahm ........................... | 279/53 |
| 1,370,598 A | * | 3/1921 | LaPointe ...................... | 279/53 |
| 3,897,159 A | | 7/1975 | Ball et al. | |
| 4,456,270 A | * | 6/1984 | Zettl, Jr. et al. .............. | 279/62 |
| 4,762,447 A | * | 8/1988 | Marantette ................... | 279/51 |
| 4,938,490 A | * | 7/1990 | Bosek ......................... | 279/51 |
| 5,030,047 A | | 7/1991 | Pfalzgraf | |
| 5,522,605 A | * | 6/1996 | Lewis et al. ................. | 279/157 |
| 5,622,373 A | * | 4/1997 | Tagami ........................ | 279/52 |
| 5,927,913 A | | 7/1999 | Mizoguchi | |
| 5,928,771 A | * | 7/1999 | Dewald, Jr. et al. ......... | 428/216 |
| 5,979,911 A | * | 11/1999 | Rinne ........................... | 279/51 |
| 6,270,086 B1 | * | 8/2001 | Lloyd ........................... | 279/51 |

FOREIGN PATENT DOCUMENTS

| | | |
|---|---|---|
| CH | 345 220 | 3/1960 |
| DE | 44 05 242 A1 | 8/1995 |
| EP | 0 304 558 A2 | 3/1980 |
| EP | 0 304 558 A2 | 3/1989 |
| EP | 0 334 191 A2 | 9/1989 |
| FR | 1.254.628 | 2/1961 |

OTHER PUBLICATIONS

Fumihiko, "Holder For Cutting Tool Unit", Patent Abstracts of Japan, No. 62 079 932, vol. 011, No. 278, (Sep. 9, 1987).

* cited by examiner

Primary Examiner—Steven C. Bishop
(74) Attorney, Agent, or Firm—Venable LLP; Norman N. Kunitz

(57) ABSTRACT

A clamping sleeve/tensioning device comprises a clamping sleeve that is positioned inside a conical centering opening of a housing body. A chucking mechanism with rotational body is used to tighten or release the clamping sleeve. The rotational body is provided with a central opening, having an internal thread or an external thread, which directly engages in the clamping sleeve. The rotational body preferably is supported via a roller bearing on a corresponding bearing surface of the housing body. The rotational body is driven via a reducing gear, for example via a worm. As a result, high tensioning forces can be generated in connection with the relatively small diameter of the tensioning thread and the small conical angle. The small diameter of the tensioning thread ensures a low thread friction.

32 Claims, 4 Drawing Sheets

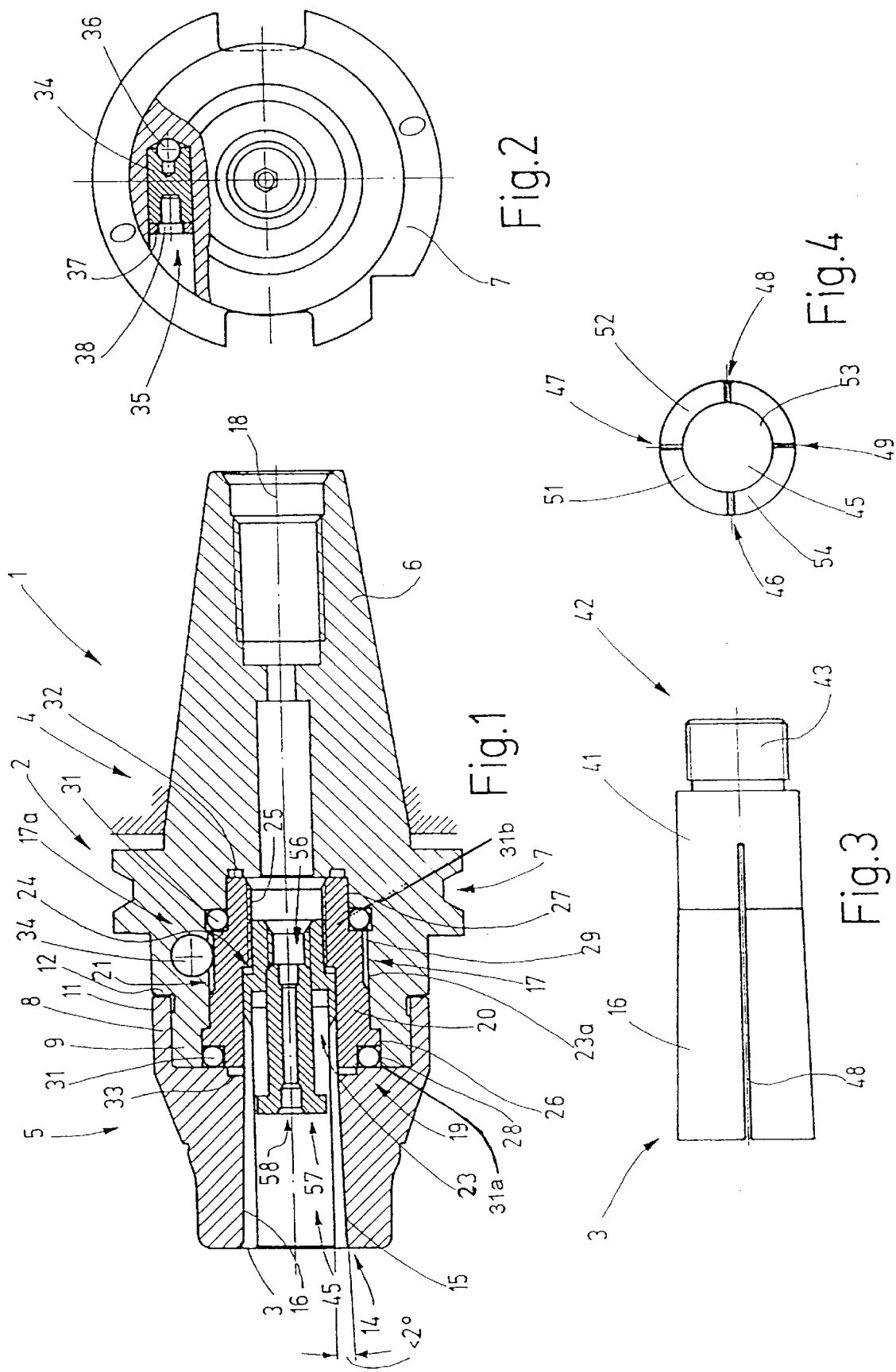

AXIAL CHUCK

CROSS REFERENCE TO RELATED APPLICATION

This application claims the priority of German Patent Application No. 100 56 729.0 filed Nov. 15, 2000 which is incorporated herein by reference.

BACKGROUND OF THE INVENTION

The invention relates to a chuck for clamping in shafts, in particular to a chuck for the frictional clamping of tool shafts.

Axial chucks for clamping in rotating tools or their shafts are known. These chucks are provided with clamping jaws or clamping sleeves for clamping a cylindrical section (shaft) of a tool. The tightening or releasing of the clamping sleeves requires access to a corresponding actuation device. The goal is to be able to actuate this clamping sleeve even if the chuck is connected to the spindle of a machine tool or if the chuck is connected to a tool-presetting device. In addition, a manual operation of the chuck should be possible without mounting device.

A high torsional moment or torque that can be transmitted is also frequently desired. Due to the frictional clamping of the tool shafts, this torsional moment requires high radial pressure forces that must be generated by the chuck.

Chucks with clamping sleeves are frequently used to clamp tools with varied shaft diameters. For this, the inside diameter of the clamping sleeve must always coincide with the shaft diameter. Intermediate layers between the tool shaft and the clamping sleeve are not practical because they worsen the rotational accuracy. Thus, it is necessary or desirable to be able to change the clamping sleeves.

A chuck is known from German patent reference No. DE 44 05 242 A1, which has a basic body with an approximately cylindrical front and a cone-shaped shaft. The basic body has an essentially rotation symmetrical design and is provided with an axially aligned through bore with a cone-shaped clamping surface region in the cylindrical section of the basic body. A clamping sleeve is arranged in this region, which is provided with an extension having an external thread that extends into the through bore. The clamping sleeve is arranged, via a pin installed on the side, such that it is axially displaceable but rotationally connected inside the through bore by the side pin. The clamping sleeve is tensioned by applying a tensile force to its extension. For this, a screw sleeve is arranged inside the through bore and is provided with an internal thread. The through bore is connected to the extension provided with an external thread. The screw sleeve is also provided with an external thread, having a different pitch than the internal thread and engages in a section of an internal thread of the through bore. As a result of the difference in pitch between the thread couplings screw sleeve/clamping jaws and screw sleeve/basic body, a tensioning movement of the clamping jaws is generated by turning the screw sleeve.

With this type of chuck, the threaded sleeve can be actuated only if the clamping device is separate from a tool spindle, meaning if the through bore that ends at the cone-shaped basic body is empty. In addition, it must be partially integrated into a mounting device to be able to generate the coaxial moment of torsion.

A chuck with a clamping sleeve that is operated via a worm is also known from the European patent reference No.

EP 0 304 558. The clamping sleeve is used for holding a tool holder and is provided at its back end with an extension having an external thread. A sleeve is fitted with radial play onto this extension. The sleeve is provided with a ring or annual flange on its end and supports itself on a threaded ring nut that is screwed onto the extension. Via a groove and tongue connection, the ring nut and the sleeve are positioned rotationally connected inside the basic body. The sleeve is provided with a tensioning thread on the outside, on which a ring nut is positioned. This ring nut is positioned in the basic body, such that it cannot be displaced axially and can be rotated. On its outside, it is provided with a toothing that is connected to a worm.

In order to increase torsional moments that can be transmitted, the basic body is provided with projections that engage in corresponding recesses of a disk-shaped flange that is connected to the tool. A chuck of this type requires a special tool adaptation in the shape of a form-locking flange for coupling. A replacement of the clamping sleeve is furthermore not planned. Moreover, the tool holder is centered with the clamping sleeve inside its relatively steep conical seat. To keep radial forces away from the clamping sleeve, this clamping sleeve is connected to an uncoupling sleeve, which in turn is connected to a chucking mechanism.

A chuck is furthermore known from practical operations, which uses a helical gear to pull clamping sleeves with a steep cone into a tensioning opening. In order to center the clamping sleeve, it is provided with a cylindrical section that is guided inside a cylindrical bore section in the chuck. The helical gear engages the clamping sleeve behind the cylindrical section and is provided with an angular mechanism (bevel gear) for the actuation.

Starting with this prior art, it is the object of the invention to create a chuck, which can tension traditional, cylindrical shafts and can transmit high torsional moments with high tensioning accuracy.

SUMMARY OF THE INVENTIION

The above object generally is achieved by a according to the invention by a chuck comprising: a clamping element with an axial opening and a cone-shaped outer surface, which is formed onto a shaft or is connected to a shaft and is provided with a tensioning thread, with the outer surface determining a conical angle <3.5°; a housing body provided with a conically extending tapered centering opening for holding the clamping element and a holding chamber for a chucking mechanism, with the centering opening leading to the holding chamber; and the chucking mechanism comprises a rotational body that is disposed inside the holding chamber coaxial to the centering opening and is positioned such that it can rotate and essentially cannot be displaced axially, and that has a thread that directly engages in the tensioning thread, and an activation means that is connected to the rotational body for selectively rotating the rotational body to cause axial displacement of the clamping element within the centering opening.

The chuck according to the invention is provided with a clamping element with conical outside shape, for example in the form of a clamping sleeve or clamping jaws, which is equipped to hold a shaft or is designed to be part of a shaft. The conical outside engages in a conical inside of a central opening in the housing body. During the axial movement of the clamping sleeve, a wedge-type effect is thus created between the conical surfaces, as a result of which the clamping sleeve is compressed in the radial direction. The clamping sleeve is provided with several, for example, three or four, longitudinal slots for this purpose.

With the chuck according to the invention, clamping sleeves or tool shafts with an extremely narrow wedge angle (preferably less than 3.5°) are tensioned. Narrow wedge angles of this type permit high tensioning forces, particularly in connection with high reduction chucking mechanisms such as worm gears or even bevel gears, but generally require additional centering. The chuck according to the invention does not require additional centering. The narrow cone is centered solely with the aid of the centering opening with its corresponding cone-shaped inside surface (wall). It has turned out that narrow centering openings that cause a self-locking of the clamping element provide excellent centering and thus a good rotational movement without requiring additional measures such as cylindrical guides or the like, despite the tilting moments, which act upon the clamping sleeve or the clamping shaft and may be caused by the angular mechanism. Surprisingly, this is true even though the clamping element can no longer "straighten itself out" once it is in a slanted position due to the self-locking feature.

Compared to coaxial clamping devices such as differential gear arrangements, angular mechanisms additionally have the advantage that in order to actuate the clamping device, they can introduce the required torsional moments into the chuck without additional devices. This advantage is particularly noticeable when releasing the chuck where high actuation moments are necessary to push away the narrow cone.

The clamping element (the clamping sleeve) is provided, for example, with an extension having an external thread, for which the outside diameter is smaller than the outside diameter of the conical clamping sleeve at the end adjacent to the extension. As a result, the clamping sleeve in the non-clamped state can be manually unscrewed from the chuck without the use of special tools. The clamping sleeve is positioned inside the housing body such that it is not rotationally connected but is fitted frictionally engaged with its outside in the opening. Thus, if the clamping sleeve is not clamped tight, it can turn freely. As a result, only basic measures such as replacing the clamping element are required to adapt the chuck to different shaft diameters and, if necessary, to different shaft shapes.

The clamping sleeve has a wedge angle of less than 3.5°, meaning the outer shell surface is tilted by less than 3.5° relative to the rotational axis. As a result, extremely high tensile forces are generated, which leads to high torsional moments that can be transmitted. The high tensile forces required for this are generated in that the rotational body engages directly on the clamping sleeve. The wedge angle preferably amounts to less than 2° and is actually 1.25° for the exemplary embodiment shown herein.

The clamping sleeve is coordinated with a chucking mechanism, which comprises a rotational body that is positioned inside the housing body, such that it can be rotated, but cannot be moved in the axial direction. Within the framework of the axial positioning, the rotational body can also have a certain, slight axial play if necessary. However, the rotational body is positioned via bearing arrangements on the housing body, such that it fits flush against the housing body in a defined, fixed position in both axial directions. The rotation of the rotational body causes the clamping sleeve, which rests frictionally non-rotating inside the opening, to be pulled into the opening and thus results in a tensioning of the clamping sleeve or in pushing it out when turned in the opposite direction. The tensioning and releasing, meaning the axial movement of the clamping sleeve is achieved with a screw-type movement of the internal thread of the rotational body, relative to the tensioning thread of the clamping sleeve. A low frictional torsional moment only is required to overcome the thread friction because its diameter is smaller than the outside diameter of the clamping sleeve, so that only low rotational moment are required to drive the rotational body during the tensioning (and releasing) of the chuck. Inversely, extremely high tensile forces and thus also extremely high clamping forces can be generated at the clamping sleeve with high drive moments of torsion.

The rotational body is activated via an angular mechanism, for example, a worm that engages in an outside toothing of the rotational body and has the immediate advantage of excellent access to the drive unit. The rotational axis for the worm crosses the rotational axis for the chuck and extends past it on the side. The worm thus can be actuated with a tool attached on the side of the chuck while the chuck is connected to a work spindle or a spindle holder. Access through the shaft of the chuck is not necessary for this.

If the chuck is released from the work spindle, the chuck can be held manually and the actuation moment, for example, 14 Nm, can be generated with a manual tool. It is not necessary to position the chuck inside a holder.

The tensioning thread connection established between the rotational body and the clamping sleeve causes an axial movement of the clamping sleeve when the rotational body is turned to tension or release a shaft. When turning the clamping sleeve, the tensioning thread connection results in an axial movement of the clamping sleeve to move it out of the housing body opening, meaning for a clamping sleeve replacement. An adaptation to different shafts is therefore easily possible, particularly since the clamping sleeve is positioned such that it can rotate inside the opening. The clamping element (the clamping sleeve) can be unscrewed from the rotational body, in particular if the fixed seat of the clamping sleeve inside the opening is somewhat loosened through a corresponding turning of the rotational body.

The tensioning thread has a radial play that exceeds any movement to the side of the rotational body. As a result, the forces of the clamping sleeve and the rotational body are uncoupled in radial direction and the forces of the clamping sleeve and the angular mechanism are also uncoupled in radial direction. The clamping sleeve is thus centered solely through the conical seat inside the centering opening. The chuck not only supplies a high torsional moment that can be transmitted, but also results in excellent centering and accuracy.

The transmittal of the torsional moment from the basic housing body to the clamping sleeve occurs only through a frictional connection between the clamping sleeve (the clamping element) and the housing body. Form-locking means for securing the clamping sleeve rotationally connected inside the opening are not provided. Also not provided are any form-locking means between the tool and the basic housing body, so that the torsional moment transmission on the whole occurs only through a frictional engagement.

As previously explained, the actuation of the rotational body, meaning its rotation, can be effected with a worm gear, in that a worm engages in the outside toothing or teeth of the rotational body. Alternatively, the rotational body can be provided with a toothing or teeth that engages in a bevel gear and functions as rotational drive for the rotational body. The worm or bevel gear can be provided with a coupling device that can engage in a special tool, for example, a square wrench, for the purposeful turning of the worm or bevel gear.

The rotational body is supported on the housing body with at least one thrust bearing in at least one axial direction. The rotational body preferably is guided with thrust bearings in both axial directions. In turn, the thrust bearings are preferably designed as roller bearings, which further reduces the drive moment required for driving the rotational body under stress, thus increasing the tensile force that can be generated with a given drive moment. As a result, the radial tensioning force of the clamping element is again increased, which permits a high torsional moment to be transmitted. In addition, it is possible to match the torsional moment required for tensioning to the actuation moment required for release. During the release, the frictional adherence of the chucking mechanism and the frictional adherence of the clamping sleeve must be overcome (moment of breaking loose), which is high in particular with a low wedge angle for the clamping sleeve of less than 3.5°. It can be kept within certain limits by positioning the rotational body on roller bearings.

The tensioning moment can be limited to maximum values, for example, 14 Nm, with a corresponding design of the actuation tools. The solution according to the invention also permits releasing the chuck again with this maximum value.

Another special feature of an advantageous embodiment of the chuck according to the invention is the rotational play of the rotational body between its clamping position and its release position. If the clamping sleeve is in the clamping position, the clamping sleeve supports itself via the rotational body and its first axial thrust bearing on the housing body. If the clamping sleeve is turned in the direction of release by overcoming the existing frictional forces, the clamping sleeve is relaxed, but remains in place in the press seat inside the conical opening. After completing the rotational play, the rotational body supports itself via the other thrust bearing on the housing body and starts to push away the clamping sleeve. The actuation is made easier and higher tensile forces are made possible as a result of the rotational play of the rotational body, resulting from the thread play of the tensioning thread connection and, if necessary, through an additional axial play of the rotational body. This results from the fact that a first maximum torsional moment occurs when releasing the clamping sleeve, which is necessary to release the interlocking of the rotational body. The completion of a rotational play results in a second maximum of the torsional moment for actuation, which is necessary to release the clamping sleeve from its fixed seat inside the opening. Since both maximum torsional moment values do not coincide, an extremely securely seated clamping sleeve can also be pushed off with the actuation device because it is not necessary to overcome at the same time the frictional adherence for releasing the rotational body and for releasing the clamping sleeve.

The release of the clamping sleeve can be further improved through a friction-reducing coating on the clamping sleeve and/or the opening wall. The coating preferably is an impact resistant material coating, deposited at low temperatures of less than 200° C. As a result, it is possible to use clamping sleeves of spring steel, without reducing the spring hardness of the spring steel.

The rotational body preferably has a central opening into which the clamping sleeve projects, thus resulting in a compact design. Radial bearings, which are preferably arranged on both sides of the angular mechanism, prevent the clamping sleeve from being out of alignment on the side. In other words, the radial bearings keep radial forces originating with the angular mechanism away from the clamping sleeve, so that this sleeve remains centered in its seat in the conical opening without requiring additional measures.

One or two sealing means or arrangements are preferably provided on the chuck, which seal the rotational body, for example, on both its fronts or ends. As a result, the bearings of the rotational body and its actuation device are protected against dirt.

If necessary, the clamping element (clamping sleeve) can be provided with a stop pin, for example, positioned such that it can be adjusted axially. A thread is used for the adjustment. The tensioning bolt preferably should be accessible from both sides. The tensioning bolt thus can be adjusted if a tool is positioned inside the clamping sleeve. In addition, the tensioning bolt can be adjusted if the chuck is attached to a tool spindle but does not hold a tool.

The clamping sleeve of one advantageous embodiment is provided with a ring or annular shoulder, to which a circular step in the rotational body is assigned. The ring shoulder and the circular step form a stop device, which prevents the clamping sleeve from being pulled too far into the opening, for example if no tool is inserted into the chuck and the rotational body is turned. Damage to the clamping sleeve can be prevented with the stop device.

The basic housing of one advantageous embodiment is designed to have two parts. It comprises a first housing part, which accommodates the rotational body, the angular drive and the bearing devices for the rotational body. A second housing part is fitted onto this first housing part. As a result, the rotational body is axially secured and the holding chamber for the rotational body is axially closed. The second housing part contains the conical seat for the clamping sleeve and is screwed to and glued to the first housing part. A continuous, precise alignment of the second housing part, relative to the first housing part, is ensured in this way. Other connecting techniques can be used; e.g., the second housing part can be shrunk onto the first housing part.

Further advantageous details follow from the drawing and the description. Exemplary embodiments of the invention are illustrated in the drawing.

BRIEF DESCRIPTION OF THE DRAWINGS

FIG. 1 shows a chuck according to the invention in a longitudinal section.

FIG. 2 is a view from the front of the chuck according to FIG. 1, in a partial section.

FIG. 3 is a view from the side of a clamping sleeve for a chuck according to FIG. 1.

FIG. 4 is a frontal view of the clamping sleeve according to FIG. 3.

DESCRIPTION OF THE PREFERRED EMBODIMENTS

Figure 5:
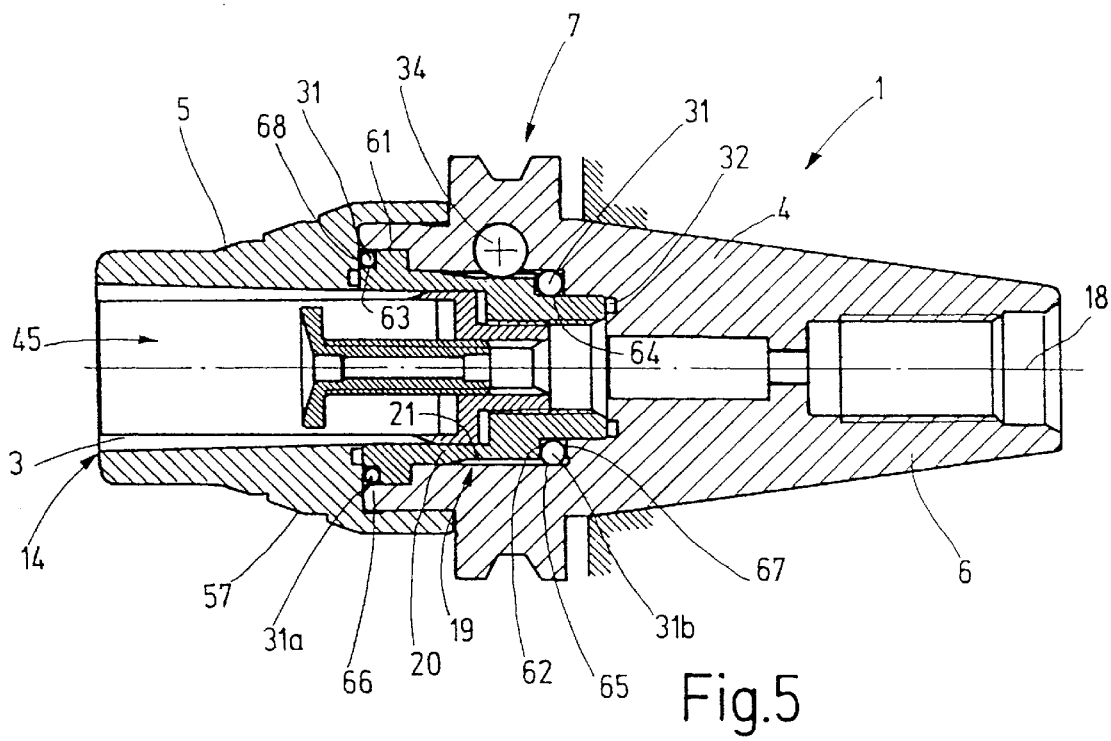
FIG. 5 shows a modified embodiment of the clamping device, shown in a longitudinal section.

FIG. 1 illustrates a chuck 1, comprising a housing body 2 and therein positioned clamping element or sleeve 3. The housing body 2 is composed of a first housing part 4 and a second housing part 5. The housing part 4 is designed to be essentially rotation symmetrical and is provided with a conical shaft 6, which is used to attach the housing body 2 to a machine spindle. In addition, the housing body 2 can be provided with an exterior gripping flange 7, known per se, for the automatic tool exchange or for otherwise handling the chuck 1.

The second housing part 5 is screwed to the first housing part 4. For this, the housing part 5 is provided with a section 8 designed in the manner of a clamping nut whose internal thread is screwed onto a threaded extension 9 of the first housing part 4. The second housing part 5 fits with its end surface area 11 flush against an annular shoulder 12 of the first housing part 4 to align the two housing parts 4, 5 relative to each other. The screw connection is secured with glue and thus cannot be unscrewed. The accuracy of the centering opening 14 is preferably produced after the joining of the housing parts.

A conically tapered axially extending centering opening 14 is formed in the second housing part 5, which opening has an essentially conical wall 15. The centering opening 14 is used for the positioning and centering of the clamping sleeve 3, which has a corresponding, cone-shaped outer wall 16 that fits flat against the wall 15. The centering opening 14 leads to a holding chamber 17, which extends into the first housing part 4, which has a rotation-symmetrical design and is arranged essentially coaxial to the centering opening 14. The centering opening 14 and the holding chamber 17 are arranged coaxial to a joint axis 18 that also forms the rotational axis for the chuck 1. The holding chamber 17 has a larger diameter than the centering opening 14. A through opening extends from the holding chamber 17 through the conical shaft 6.

A chucking mechanism 19 that includes a sleeve-shaped rotational body 20 rests inside the holding chamber 17. The rotational body 20 functions to pull the clamping sleeve 3 axially into the centering opening 14 and to push it back out of this opening. For this, the rotational body 20 is positioned inside the holding chamber 17, such that it can rotate but essentially cannot be displaced axially The rotational body 20 is provided with a central opening 23 with an essentially cylindrical design, which smoothly adjoins the wall 15 and acts as an extension thereof. Approximately in the center of the rotational body 20, the central opening 23 narrows down near an annular radial shoulder 24. Starting from the shoulder 24, the inner surface of the body 20 forming the narrower portion of the central opening 23 is provided with an internal thread 25.

For a rotating positioning of the rotational body 20 inside the holding chamber 17 (radial positioning), the rotational body 20 is provided with cylindrical outer surface portions 26, 27 that are guided along corresponding cylindrical inside surface portions of the holding chamber 17, which form radial bearings. Axial thrust surfaces 28, 29 are used for the axial positioning. These surfaces are supported via roller bearings, e.g., balls 31, on corresponding axially oriented surfaces of the holding chamber that form axial bearings 31*a*, 31*b*.

Housing part 4 contains an annular groove 32 with inserted sealing means, e.g., an O-ring, which surrounds the through opening and faces the holding chamber 17. The annular groove 32 is designed to seal the central opening 23 and the centering opening 14 against the remaining portion of the holding chamber 17. A corresponding annular groove 33 is provided in the second housing part 5, which surrounds the centering opening 14 and faces the holding chamber 17. This annular groove 33 also holds a sealing means such as an O-ring. Both O-rings fit flush against the respective frontal face of the rotational body 20, thereby sealing in particular the roller bearings 31*a*, 31*b* that are formed with the balls 31.

An angular mechanism is used to actuate the rotational body 20, meaning to rotate it. This mechanism includes a worm 34, which has a rotational axis positioned crosswise to the axis 18 and engages in teeth 21 that are provided on the outer surface of the rotational body 20. The rotational body 20 and the angular mechanism form a chucking mechanism. FIG. 2 in particular shows that the worm 34 is held inside a respective lateral bore 35, such that it can rotate but cannot be displaced axially. The pitch for the worm 34 is selected such that front of the worm 34 is supported via a ball 36 on the bottom of the lateral bore 35 during the tightening of clamping sleeve 3. In the opposite direction, the worm 34 is secured with a lock washer or snap ring 37. An inside profile 38 that is provided in the free frontal area of worm 34, e.g. a hexagon or the like, serves as coupling device for attaching a respective tool.

The clamping sleeve 3 is shown separately in FIGS. 3 and 4. It has a first conical section on which the conical outer shell surface 16 is formed, which is followed by a cylindrical section 41 that projects into the central opening 23 if the clamping sleeve 3 is inserted into the opening 14. This section is followed by an extension 42 with smaller outside diameter than the outside diameter of section 41. The outer surface of the extension 42 is provided with a tensioning thread 43 that matches the internal thread 25 of the rotational body 20.

FIG. 1 or 4 show that the clamping sleeve 3 is provided with a shaft opening 45 for holding the cylindrical clamping shaft of a tool. The shaft opening 45 is oriented coaxial to the axis 18. Radial slots 46, 47, 48, 49 lead from the outer circumference of the clamping sleeve 3 to the shaft opening 45, so that four separate clamping fingers 51, 52, 53, 54 are freed. These are moved in radial direction toward each other if the clamping sleeve 3 is pulled into the opening 14.

The clamping sleeve 3 is provided at least on the outer surface 16 with a friction-reducing coating. Alternatively or in addition, the wall of the centering opening 14 can also be provided with a friction-reducing coating. Tungsten carbide with excess carbon (TCC), a diamond-like carbon coating, or another smooth, impact-resistant hard material coating can be considered for the coating. The coating facilitates the tensioning and makes it easier to overcome the frictional adherence between the clamping sleeve 3 and the wall of the centering opening 14 during the detachment. The friction-reducing coating still permits transmitting the frictional torsional moment in the tensioned state, despite the reduction in friction. An additional form-locking protection against torsion can be provided, if necessary, which is effective between the clamping sleeve 3 and the basic body 2.

FIG. 1 shows that the clamping sleeve 3 can be provided with a through opening 56 with internal thread, into which the shaft of an adjustment pin 57 is fitted. In addition, the adjustment pin 57 has a head that is located inside the shaft opening 45 and forms an end stop for a tool shaft to be inserted into the shaft opening 45. The adjustment pin 57 can be hollow on the inside to provide a conduit for cooling fluid. Furthermore, it can be provided on both ends with a coupling means, for example, a hexagon socket 58 to permit a purposeful turning with a manual tool.

The chuck 1 described so far operates as follows:

The initial state of chuck 1 is assumed to be as shown in FIG. 1, meaning a clamping sleeve 3 is inserted into the centering opening 14 in such a way that the thread 43 of extension 42 is engaged with internal thread 25 in the central opening 23. The outside surface 16 of clamping sleeve 3 fits frictionally engaged in the conical surface 15. However, the clamping sleeve is not yet tightened. In this state, a cylindrical shaft of a tool can be inserted into the shaft opening 45.

Once this has happened, the chuck 1 can be actuated such that the tool shaft is tightened inside the clamping sleeve 3 and thus also in the chuck 1. For this, the worm 34 is turned with a suitable tool, for example, a screwdriver or wrench, such that the rotational body 20 is turned with a corresponding reduction. The rotational body 20 is turned in the direction, so that the internal thread 25 pulls the extension 42 into the central opening 23. As a result, the clamping sleeve 3 is pulled into the centering opening 14 and the tool shaft is tightened. In the process, the rotational body 20 supports itself via the balls 31 on the second housing part 5.

Due to the wedge effect of the clamping sleeve 3, meaning the acute angle of 1° to 2°, with which its outer shell surface (outside 16) encloses the cylindrical inside surface of the shaft holding opening 45, the tension exerted by the rotational body 20 on the extension 42 and thus also the clamping sleeve 3 causes a radial surface pressure. This pressure on the one hand tightens the cylindrical shaft of the tool inside the clamping sleeve 3 and, on the other hand, secures the clamping sleeve rotationally connected inside the opening 14.

As a result of the friction occurring at the internal thread 25 and the automatic locking of worm 34, the clamping sleeve 3 remains in the tensioned position, so that the clamped tool can be operated in both rotational directions, moving to the right as well as to the left. This can occur without additional protection against twisting for the clamping sleeve 3 and with a high torsional moment. The easy motion of the rotational body 20 in particular ensures the high torsional moment during the tensioning. The positioning of the rotational body 20 via the axial roller thrust bearing 31a, formed with balls 31, and the small diameter of extension 42 contribute to the easy motion.

To release the clamped-in tool, the clamping sleeve 3 must be moved in the axial direction out of the opening 14, or at least its fixed seat must be released. For this, the rotational body 20 is turned in the opposite direction. For this, the friction holding the rotational body 20 in its clamped position must first be overcome. The friction above all is generated on the external thread 43 of extension 42 by turning the worm 34 in the opposite direction. Initially, the worm 34 is detached and then passes through the teeth backlash that ensues between the worm movement and the outside toothing 21 of the rotational body 20, with which it is engaged. Once it has passed through the backlash, the worm 34 initially detaches the rotational body 20 through an additional rotation. The rotational body can then turn freely within the framework of its own axial play and the spindle play between the flanks of the internal thread 25 and the external thread 43. If rotated further, the flanks of threads 25 and 43 again engage and the rear thrust bearing 31b, shown on the right in FIG. 1, takes over the additional support of the rotational body 20. The rotational body, if turned further, unscrews the extension 42 from the central opening 23 and thus pushes the clamping sleeve 3 from its press fit.

By purposely maintaining a certain play between the flanks of threads 25, 43 and/or a certain axial mobility of rotational body 20, it is possible to achieve a rotational play between the maximum torsional moment required for detaching the clamped-in rotational body 20 and the maximum torsional moment necessary for pushing away the clamping sleeve 3. Thus, even a clamping sleeve 3 that is seated very tightly can be released again with relatively low actuation moments. In particular, the releasing moment can be limited to a value that does not exceed the value required for tightening. Inversely, it permits a chuck design for extremely high clamping forces, meaning the use of clamping sleeves with extremely narrow wedge angle and extremely high chucking mechanism reductions. The wedge angle between the outside surface 16 and the rotational axis 18 can be smaller than 2° and preferably amounts to 1.25°. The clamping sleeve 3 is thus held self-locking inside the centering opening 14.

If a tool with a different clamping shaft, for example a clamping shaft with smaller diameter, is to be tightened then the clamping sleeve 3 must be replaced. In the detached state, the clamping sleeve can be easily unscrewed for this from the centering opening 14. In this state, it can be turned and is held only with its extension 43 in the internal thread 25 of the central opening 23. Once the clamping sleeve 3 is removed from the centering opening 14, another clamping sleeve 3 can be inserted into the centering opening 14 and can be screwed with a few rotations into the central opening 23. The chuck 1 is thus ready for clamping in another tool.

The clamping sleeve 3 can also remain on the tool, meaning if the chuck 1 is released, the tool with the clamping sleeve 3 can be unscrewed from the centering opening 14.

If a new clamping sleeve 3 is inserted into the centering opening 14 and if the clamping sleeve 3 has not yet been provided with a tool, damage to the clamping sleeve 3 through accidentally tightening the chuck 1 is avoided with the annular shoulder 24. The frontal surface of clamping sleeve 3 that is adjacent to the extension 42 rests against this shoulder 24 before the clamping sleeve 3 is pulled far enough into the centering opening 14 to cause irreversible damage to the clamping sleeve.

FIG. 5 shows a modified exemplary embodiment of the chuck 1. With the exception of the following details, this chuck is identical to the chuck 1 (FIGS. 1–4) described in the above and we refer to this description. In contrast to the above-described chuck 1, the chuck 1 according to FIG. 5 has a shorter structural design. The worm 34, which is arranged in front of the gripping flange 7 for the chuck 1 according to FIG. 1, is arranged in the area of gripping flange 7 for the chuck according to this Figure, thus resulting in an even more compact design.

FIG. 5 shows that the front and rear thrust bearings 31a, 31b not only position the rotational body 20 in axial direction, but simultaneously also in radial direction, provided the balls 31 are assigned not only to axially oriented surfaces, but also to cylinder surfaces formed on the housing part 4 or the rotational body 20. For this, the rotational body 20 is provided with the annular radially extending surfaces 61, 62 and the cylindrical surface 63, 64 shown in FIG. 5. The cylindrical surfaces 65, 66 as well as the annular surface 67 are provided on the housing part 4. The front of the housing part 5 is provided with an annular surface 68 for positioning. As a result, the annular surfaces 61, 68 with balls 31 form the first axial thrust bearing 31a and the annular surfaces 62, 67 with balls 31 form the second axial thrust bearing 31b. The cylindrical surfaces 64, 65 together with the balls 31 form the second radial bearing. The cylindrical surfaces 63, 66 together with the balls 31 form the first radial bearing.

Figure 6:
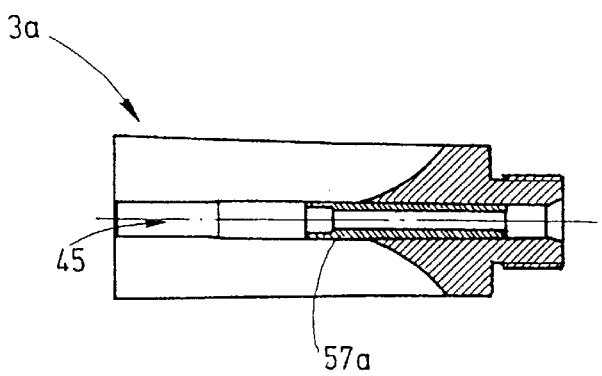
FIGS. 6 and 7 show clamping sleeves or clamping jaws for the chuck according to FIG. 5.
Figure 7:
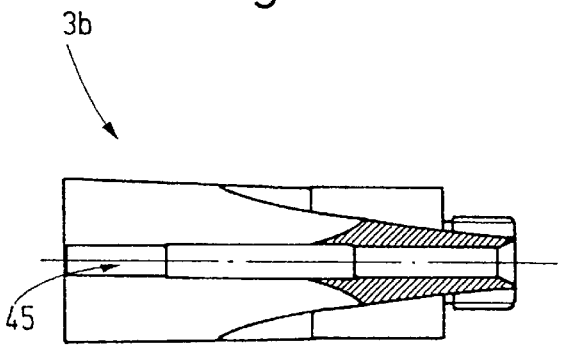

FIGS. 6 and 7 finally illustrate clamping sleeves 3a, 3b with smaller inside diameters. Corresponding to the small diameter of their shaft holding opening 45, a matching narrow adjustment pin 57a is inserted (FIG. 6). This pin can also be omitted, as shown in FIG. 7.

Figure 8:
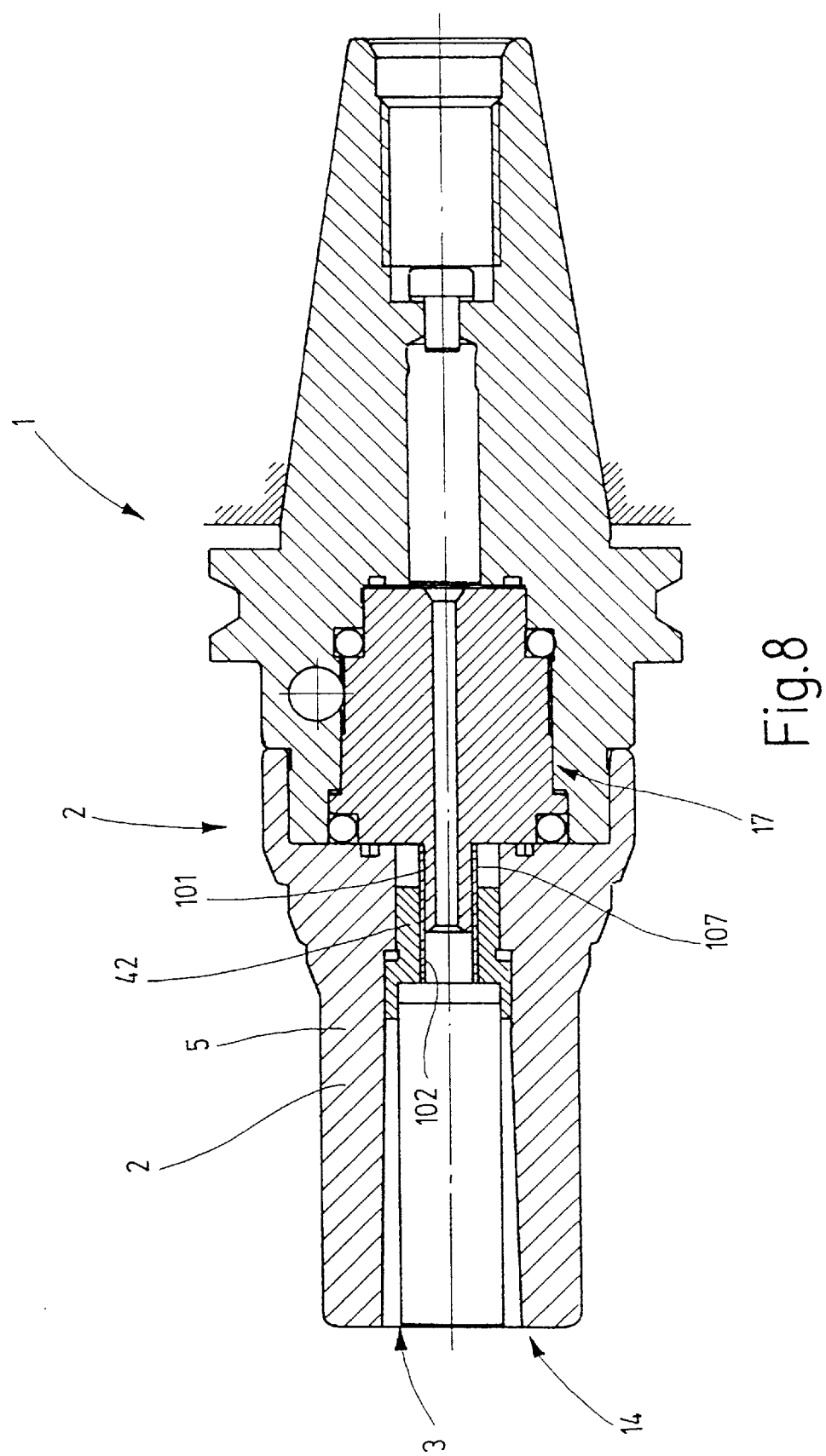
FIG. 8 shows an alternative embodiment of a chuck according to the invention, shown in a longitudinal section.

FIG. 8 illustrates an alternative embodiment of the clamping device 1 with clamping sleeve 3'. We point to the above description for all features that are identical with respect to design and function and for which the same reference numbers are used. In contrast to the above-described embodiment, the rotational body according to FIG. 8 is provided with an axial extension 101 on the side facing the clamping sleeve 3', which extension has an external thread 107 and extends in the shaft or extension 42' of the clamping sleeve or element 3'. The tensioning thread for the clamping element or sleeve 3' is an internal thread, which is provided in a bore of the extension 42'. The extension 101 is positioned with radial play inside the part 5 of housing body 2 and is thus free on the side. The centering occurs only through the centering opening 14. The advantage of this embodiment is the low thread friction because of the small thread diameter. The tensioning thread connection, formed when the internal thread 102 engages in the external thread 107, is arranged in front of the holding chamber 17 and permits a narrow structural design of the chuck 1.

Figure 9:
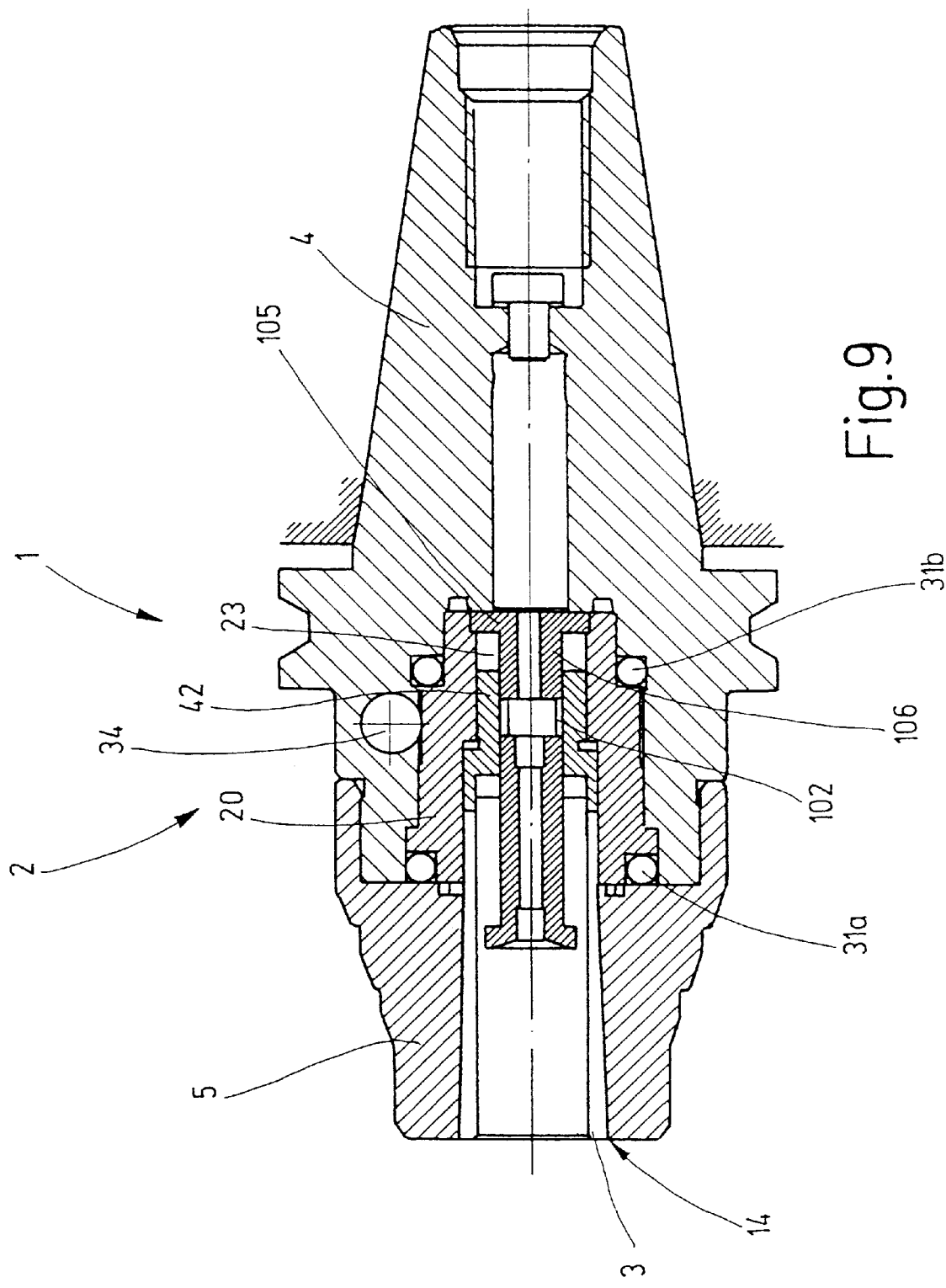
FIG. 9 shows another embodiment of a chuck, in a longitudinal section view.

FIG. 9 shows that a short structural design can alternatively be selected. The chuck 1 shown is provided with a rotational body 20 with central opening 23, in which a bolt 105 with external thread is positioned. This bolt is fixedly connected to the rest of rotational body 20, is provided with an extension 106 that projects in the direction of the clamping sleeve 3' and has an external thread that engages in the internal thread 102 of clamping sleeve 3. The extension 42 of the clamping sleeve is not guided in radial direction by the rotational body 20. Rather, the clamping sleeve 3' is guided only in the part 5 of housing body 2, meaning inside the centering opening 14. Thus, tilting moments, radial movements and tilting movements of the rotational body 20 are not transmitted to the clamping sleeve 3'. The bolt 105 can be welded, glued or otherwise fixedly connected to the rotational body 20 in axial direction and in rotational direction.

The advantage of this design is the arrangement of the tensioning thread connection between the bearings 31a, 31b, in the same way as for the design shown in FIG. 1. As a result of this arrangement, side movements, radial movements, tilting movements of the rotational body and the like are not transmitted to a noticeable degree to the clamping element 3. In particular, this is true because the rotational body 20 essentially is connected to the clamping element 3 only via the tensioning thread connection, meaning the rotational body 20 and the clamping sleeve 3 do not otherwise come in contact. The rotational body 20 therefore does not take over any guidance of the clamping sleeve 3, which is also true for all other embodiments.

In summary, a clamping device 1 arrangement is provided with a clamping sleeve 3 that is positioned inside a conical centering opening 14 of a housing body 2. A chucking mechanism 19 with rotational body 20 is used to tighten and release the clamping sleeve 3. The rotational body has a central opening 23 that is provided with an internal or an external thread and engages directly in the clamping sleeve 3. The rotational body 20 preferably supports itself via a roller bearing on a corresponding bearing surface of housing body 2. The rotational body 20 is driven with a reducing gear, for example, with the aid of a worm 34. As a result, high tensioning forces can be generated in connection with the relatively small diameter of the tensioning thread 25 and the small conical angle. The small diameter of tensioning thread 25 ensures a low thread friction.

The invention now being fully described, it will be apparent to one of ordinary skill in the art that many changes and modifications can be made thereto without departing from the spirit or scope of the invention as set forth herein.

What is claimed is:

1. A chuck comprising:
    a clamping element with an axial opening and a cone-shaped outer surface, which is connected to a hollow rearwardly extending axial shaft that is provided with a tensioning thread, with the outer surface determining a conical angle <3.5°;
    a housing body provided with a conically tapered axially extending centering opening in which at least a forward portion of the clamping element is disposed, and a holding chamber for a chucking mechanism, with the centering opening leading to the holding chamber; and
    a chucking mechanism including a rotational body that is disposed inside the holding chamber coaxial to the centering opening, and is mounted such that it can rotate and essentially cannot be displaced axially, with said rotational body having a thread that directly engages the tensioning thread of the clamping element, and actuation means connected to the rotational body for selectively rotating the rotating body to cause axial displacement of said clamping element; and wherein the tensioning thread connection has a radial play that exceeds any radial movement of the rotational body, caused by the actuating means.

2. A chuck according to claim 1, wherein the clamping element is centered in the housing body only by fitting the conical outer surface against a housing wall defining the central centering opening, and the conically shaped portion of the clamping element is provided with a plurality of slots that are distributed about its periphery, that extend lengthwise parallel to the axis, and that have a radial depth.

3. A chuck according to claim 1, wherein the rotational body has a central recess in which a rear portion of the clamping element, including said shaft, sits; and said tensioning thread is an external thread that is disposed on an outer surface of said shaft of said clamping element, and that engages an internal thread in said central recess of said rotational body.

4. A chuck according to claim 1, wherein the rotational body is provided with an axial extension with an external thread that engages an internal thread, as tensioning thread formed in said shaft of said clamping element.

5. A chuck according to claim 1, wherein the actuation means is arranged in substantially the same plane as the tensioning thread.

6. A chuck according to claim 4, wherein the tensioning thread is disposed outside of a radial plane in which the angular actuating means is arranged.

7. A chuck according to claim 1, wherein the actuating means is arranged to the side of the clamping element.

8. A chuck according to claim 1, wherein the actuating means includes gear teeth provided on an outer circumferential surface of said rotational body and engaged by a worm gear mounted in said housing and extending transverse to said longitudinal axis of said chuck.

9. A chuck according to claim 7, wherein the actuating means include gear teeth on an outer circumferential surface of said rotational body and engaged by a gear mounted on said housing.

10. A chuck according to claim 1, wherein the actuation means includes handling means or a coupling means for providing an external connection arranged on a side surface of the housing body.

11. A chuck according to claim 1, wherein the rotational body is supported on the housing body, in a tensioning direction for the clamping element, via a first axial thrust bearing, and is supported on the housing body, in the release direction for the clamping element, via a second axial thrust bearing.

12. A chuck according to claim 11, wherein at least one of the first axial thrust bearing and the second axial thrust bearing is a roller bearing.

13. A chuck according to claim 1, wherein the rotational body is supported on the housing body at both of its ends on respective radial bearings, and the actuating means engages the rotational body between the radical bearings.

14. A chuck according to claim 1, wherein the tensioning thread has a smaller diameter than any other outer diameter of the clamping element, and the clamping element can be unscrewed from the rotational body.

15. A chuck according to claim 1, wherein the tensioning thread connection and the axial play of the rotational body determine a rotational play of the rotational body between a tensioning position, in which the rotational body pulls the clamping element into the centering opening, and a release position, in which the rotational body pushes the clamping element from its tensioned position.

16. A chuck according to claim 3, wherein the rotational body in its central opening is provided with an annular radial shoulder that faces an end surface of the clamping element to form an arrangement for limiting a tensioning distance for the clamping element.

17. A chuck according to claim 1, wherein the clamping element has an axial through opening that follows the shaft opening and is provided with an internal thread.

18. A chuck according to claim 17, wherein an adjustment bolt, provided with an external thread, is inserted into the through opening.

19. A chuck according to claim 18, wherein following the holding chamber, the housing body is provided with a through bore for providing access to the adjustment bolt.

20. A chuck according to claim 1, wherein the housing body is arranged
to be connected to a working spindle of a machine tool, as well as to be connected to tool revolvers or similar tool holders.

21. A chuck according to claim 1, wherein the housing body is a two part housing including a first housing part and a second housing part that are joined at the holding chamber.

22. A chuck according to claim 21, wherein the housing parts are joined inseparably.

23. A chuck according to claim 1, wherein the housing body is provided on its front with a level surface surrounding the centering opening for supporting tools or their parts.

24. A chuck comprising:
a clamping element with an axial opening and a cone-shaped outer surface, which is connected to a hollow rearwardly extending axial shaft that is provided with a tensioning thread, with the outer surface determining a conical angle 3.5°;
a housing body provided with a conically tapered axially extending centering opening in which at least a forward portion of the clamping element is disposed, and a holding chamber for a chucking mechanism, with the centering opening leading to the holding chamber; and
a chucking mechanism including a rotational body that is disposed inside the holding chamber coaxial to the centering opening, and is mounted such that it can rotate and essentially cannot be displaced axially, with said rotational body having a thread that directly engages the tensioning thread of the clamping element, and actuation means connected to the rotational body for selectively rotating the rotating body to cause axial displacement of said clamping element; and
wherein: the rotational body is supported on the housing body, in a tensioning direction for the clamping element, via a first axial thrust bearing; the rotational body is supported on the housing body, in the release direction for the clamping element, via a second axial thrust bearing; and each of said first and second thrust bearings is a roller bearing.

25. A chuck according to claim 24, wherein at least one sealing device is located adjacent to each thrust bearing.

26. A chuck, comprising:
a clamping element with an axial opening and a cone-shaped outer surface, which is connected to a hollow rearwardly extending axial shaft that is provided with a tensioning thread, with the outer surface determining a conical angle <3.5°;
a housing body provided with a conically tapered axially extending centering opening in which at least a forward portion of the clamping element is disposed, and a holding chamber for a chucking mechanism, with the centering opening leading to the holding chamber; and
a chucking mechanism including a rotational body that is disposed inside the holding chamber coaxial to the centering opening, and is mounted such that it can rotate and essentially cannot be displaced axially, with said rotational body having a thread that directly engages the tensioning thread of the clamping element, and actuation means connected to the rotational body for selectively rotating the rotational body to cause axial displacement of said clamping element; and
wherein at least one of the outer surface of the clamping element and the housing wall defining the centering opening is provided with a friction-reducing coating.

27. A chuck according to claim 26, wherein the tensioning thread connection has a radial play that exceeds any radial movement of the rotational body, caused by the actuating means.

28. A chuck according to claim 26, wherein the frictional value of the coating is 0.05 to 0.15.

29. A chuck according to claim 28 wherein the rotational body is axially supported in the housing body by first and second axial thrust bearings; and each axial thrust bearing is a roller bearing.

30. A chuck according to claim 26, wherein the coating is an impact-resistant hard material coating.

31. A chuck according to claim 26, wherein the coating is a smooth, diamond-like carbon coating, or other type of coating that must be deposited at temperatures of <200° C.

32. A chuck according to claim 26, wherein the coating is a tungsten carbide coating with excess carbon or another type of coating deposited at temperatures <300° C.

* * * * *